Feb. 13, 1945.  J. J. KIRBY  2,369,240
SOLDERING MACHINE
Filed May 10, 1943   3 Sheets-Sheet 1

Inventor
James J. Kirby
by Parker Carter
Attorneys.

Feb. 13, 1945.  J. J. KIRBY  2,369,240
SOLDERING MACHINE
Filed May 10, 1943  3 Sheets-Sheet 2
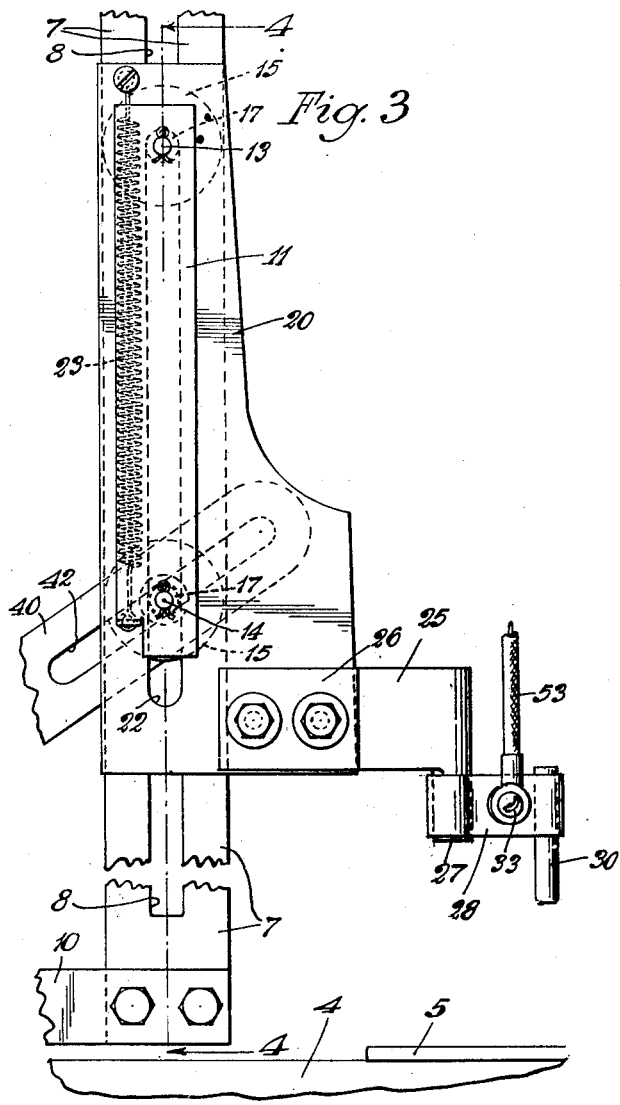
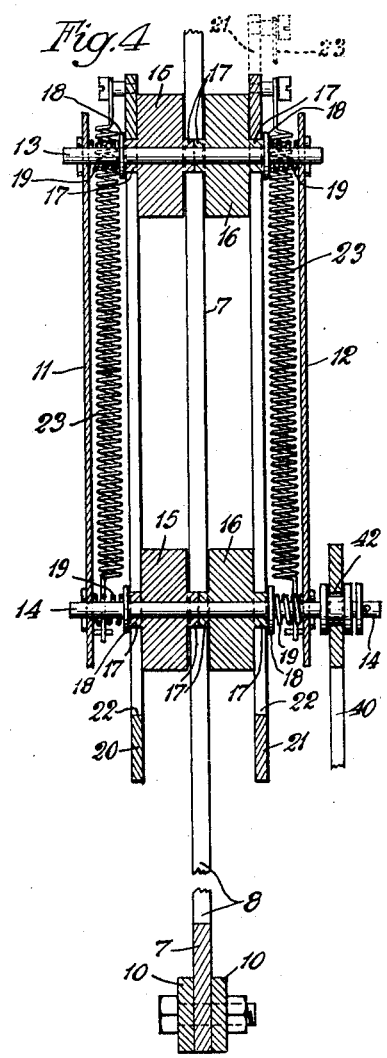
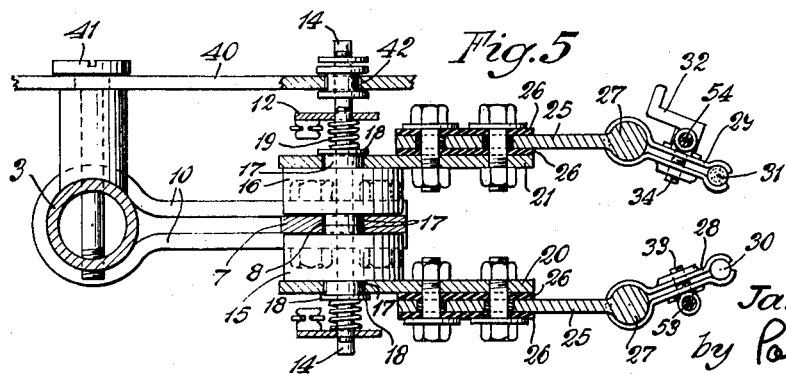
Inventor
James J. Kirby
by Parker & Carter
Attorneys Feb. 13, 1945.　　　J. J. KIRBY　　　2,369,240
SOLDERING MACHINE
Filed May 10, 1943　　　3 Sheets-Sheet 3
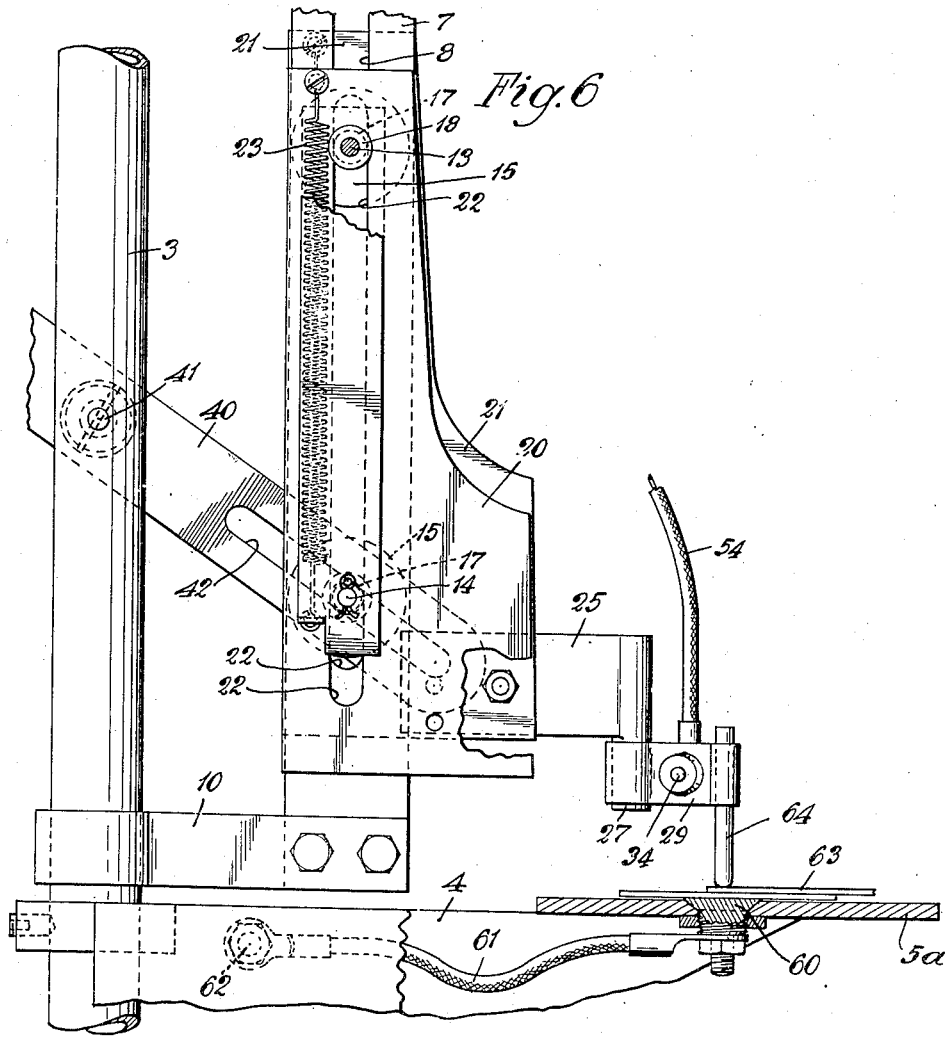
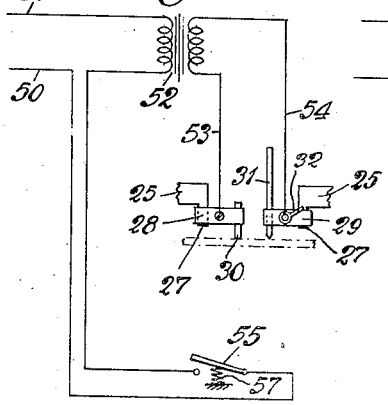
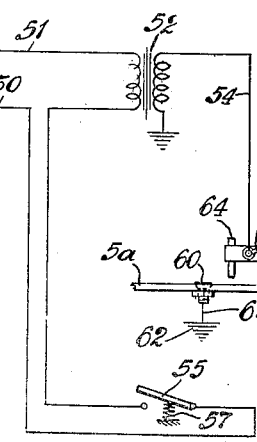
Inventor
James J. Kirby
by Parker & Carter
Attorneys Patented Feb. 13, 1945

2,369,240

UNITED STATES PATENT OFFICE 2,369,240

SOLDERING MACHINE

James J. Kirby, Chicago, Ill.

Application May 10, 1943, Serial No. 486,335

5 Claims. (Cl. 219—12)

My invention relates to an improvement in soldering and welding devices.

One purpose is to provide an easily operative welding tool, in which the electrodes and the work may be quickly moved into contact and quickly released.

Another purpose is to provide such a device which may be employed both for soldering and for light spot welding.

Another purpose is to provide means for closing the electrode circuit, in synchronism with the movement of electrodes toward the work.

Other purposes will appear from time to time in the course of the specification and claims.

I illustrate the invention more or less diagrammatically in the accompanying drawings wherein:

Fig. 3 is a partial side elevation on an enlarged scale;

Fig. 4 is a section on the line 4—4 of Fig. 3;

Fig. 5 is a section on the line 5—5 of Fig. 1;

Fig. 6 is a view similar to Fig. 3, with the parts in a different position, and with the device modified to serve as a spot welder;

Fig. 7 is a wiring diagram illustrating the employment of the device for soldering; and Fig. 8 is a wiring diagram of the device illustrating its use for spot welding or soldering.

Like parts are indicated by like figures throughout the specification and drawings.

Figure 1:
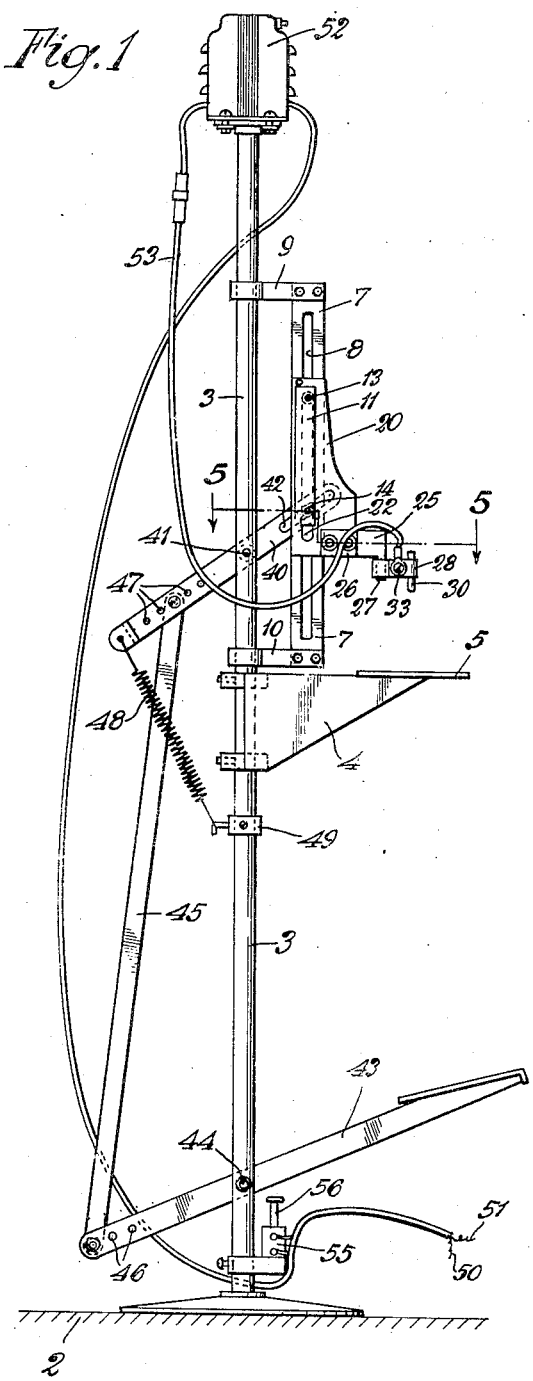
Fig. 1 is a side elevation.
Figure 2:
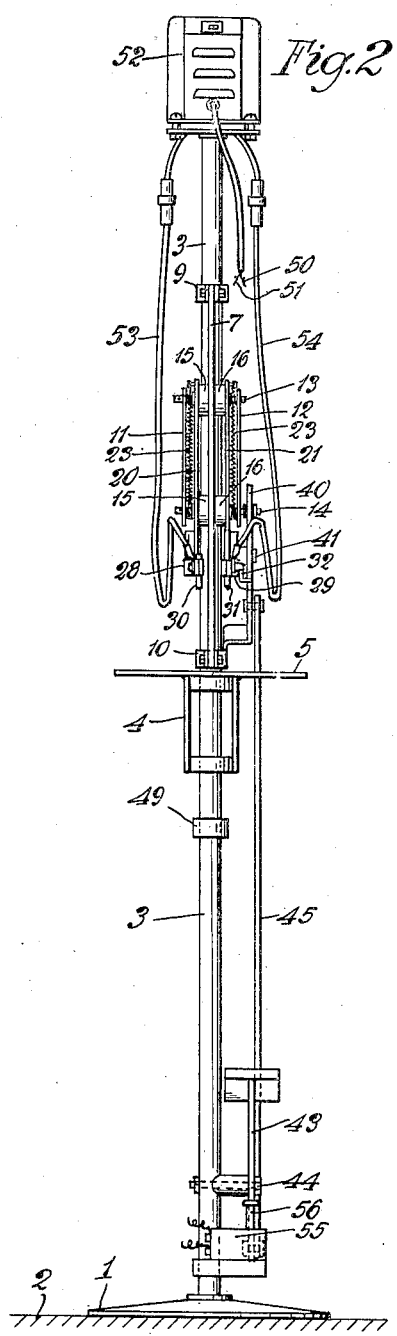
Fig. 2 is a front elevation.

Referring to the drawings, I generally indicates any suitable base adapted to be positioned on the supporting floor or surface 2. 3 indicates an upwardly extending standard or frame, on which is adjustably mounted a work support 4, carrying a table 5. 52 illustrates any suitable transformer which may be located for convenience at the top of the standard 3. 7 is a guide member shown as generally parallel with the standard 3 and provided with a slot 8. It is supported on the standard 3 by connections 9 and 10 which may, if desired, be made adjustable along said standard.

Slidably mounted for movement along the guide 7 is a working head, which includes side members 11 and 12, through which pass pins or rods 13 and 14. Mounted on each rod is a pair of spacers 15 and 16, the spacers having outwardly extending central bosses 17 at each side thereof. The opposed bosses 17 of each pair of such spacers extend into the slot 8 and abut against each other, preventing any gripping of the spacers 15, 16 against the exterior of the member 7.

The spacers are urged into the position in which they are shown in Fig. 4 by the employment of washers 18 and coil springs 19.

Normally held against movement in relation to the working head above described are a pair of electrode carriers, each such electrode carrier including a plate 20 or 21. Each of these plates is slotted as at 22, the slots being of such length as to permit a substantial movement of the plate in relation to the working head.

The pins or rods 13 and 14 pass through these slots. Springs 23 normally urge the plates downwardly as far as the engagement of the ends of the slots 22, with the top bosses 17, permits.

The plates 20 and 21 are shown as having each an outwardly extending arm 25, which is insulated from the plate 20 or 21 respectively by insulating material, as indicated at 26. Each said arm is shown as having a downwardly extending pin 27 to which is adjustably secured an electrode holding clip, the clips being shown at 28 and 29 as in Fig. 5.

It is understood that these clips are rotatively adjustable and may be set at various angles in relation to each other, so that the spacing apart of the electrodes may be varied.

30 indicates a copper electrode in the clip 28, and 31 a carbon electrode in the clip 29. 32 is a handle for quick release of the carbon electrode. The securing means for releasing or gripping the electrodes also serves to release and grip the members 27, for adjustment of the clips. I illustrate for example locking screws 33 and 34, the screw 34 being unitary with the handle 32. The working head may be bodily moved, for example by the employment of the lever 40 pivoted intermediate its length to the standard 3 as at 41. The lever has a slot 42 through which may pass one end of the rod 14. The lever may be rotated by the foot pedal lever 43 pivoted to the standard 3 as at 44. One arm of the lever 43 is connected to the lever 40 by the link 45. Adjusting apertures 46 and 47 are shown on the levers 43 and 40 respectively.

48 is a spring, one end of which is secured to the adjustable collar 49 on the standard 3. The other end is secured to the lever 40. It serves normally to hold the working head upwardly withdrawn from the work.

The circuit for the electrodes is illustrated in Figure 7. The primary circuit includes the conductive lines 50, 51. 52 indicates any suitable transformer, the secondary circuit of which may be closed through the electrodes 30 and 31 by conductive lines 53 and 54. 55 indicates any suitable switch in the primary circuit. It is shown in Fig. 1 as having a control button 56, which is engaged by the pedal 43 shortly after the pedal begins its downward movement. It will be understood that any suitable means are employed for normally holding the switch 55 open, such means being diagrammatically illustrated at 57. Thus the circuit is not closed unless the foot pedal is pressed down.

When it is desired to use the device as a spot welder, the structure shown in Fig. 6 is employed. An electrode insert of copper, shown at 60 in Fig. 6 is removably secured in the table 5a. 61 indicates a wire extending from the electrode 60 to any suitable grounding connection 62. Only one of the electrode carriers is used. The work is indicated in 63. 64 indicates a copper electrode.

The structure shown in Fig. 6 may also be employed for soldering, but in that event a carbon electrode is substituted, for the copper electrode 64.

Fig. 8 diagrammatically indicates the circuit for the above described structure, one side of the secondary coil of the transformer 52 being grounded.

It will be realized that whereas I have described and have shown a practical and operative device, nevertheless many changes may be made in size, shape, number and disposition of parts. I, therefore, wish my description and drawings to be taken as in a broad sense illustrative and diagrammatic, rather than as limiting me to the specific details shown.

The use and operation of the invention are as follows:

The working head including the side members 11 and 12 is moved unitarily toward and away from the work positioned on the work supporting table 5. The foot pedal 43, with its actuating connections, is a convenient means for moving this head. As the head moves downward toward the work, the electrodes move in unison with the head, the electrode circuit being open until the electrodes are moved toward the work, due to the employment of the normally open switch 55.

The spring 23, while normally holding the electrode carriers against movement in relation to the head, permits the electrodes to move in relation to the head or in relation to each other. Thus where work of irregular form is soldered, the electrodes conform freely to irregularities of surface contour, or to variations in thickness of the work. The electrodes may be adjusted laterally toward and away from each other by merely rotating the clips 28 or 29 about the members 27. Since the electrode has to be replaced from time to time, I employ the handle 32 for permitting ready removal.

With reference to the form of Figures 6 and 8, I provide a copper electrode 60 inserted in the table. Then a single electrode 64 is employed above the work. In soldering, this electrode is of carbon. If necessary the device may be employed for light spot welding; in that event the electrode 64 is of copper. However, the device is primarily a soldering machine, and is not intended for heavy welding.

I claim:

1. In a soldering and welding machine, a base, a fixed horizontal work support on said base, a vertical guide adjacent said work support, a working head mounted for vertical reciprocation on said guide toward and away from the work on said work support, a plurality of laterally separated electrode carriers vertically movably mounted on said working head, an electrode on each said carrier, a circuit in which said electrodes are included in circuit with a source of electric power, means for resiliently holding said head and carrier withdrawn from the work support and the work thereon, means for reciprocating said working head and carriers toward the work and yielding means tending to hold each said carrier against movement in relation to the working head, but adapted to permit each said carrier to move in relation to said working head in response to contact of the electrode by the work at the end of a movement of said working head toward the work support.

2. In a soldering and welding machine, a base, a fixed horizontal work support on said base, a vertical guide adjacent said work support, a working head mounted for vertical reciprocation on said guide toward and away from the work on said work support, a plurality of laterally separated electrode carriers vertically movably mounted on said working head, an electrode on each said carrier, a circuit in which said electrodes are included in circuit with a source of electric power, means for resiliently holding said head and carrier withdrawn from the work support and the work thereon, means for reciprocating said working head and carriers toward the work and yielding means tending to hold each said carrier against movement in relation to the working head, but adapted to permit each said carrier to move in relation to said working head in response to contact of the electrode by the work at the end of a movement of said working head toward the work support, said electrodes being mounted for lateral adjustment toward and away from each other.

3. In a soldering and welding machine, a base, a fixed horizontal work support, a vertical guide adjacent said work support, a working head mounted for vertical reciprocation on said guide toward and away from the work support, an electrode carrier vertically movably mounted on said head, an electrode on said carrier, a circuit in which said electrode is included in circuit with a source of electric power, resilient means for holding said head and carrier withdrawn from the work, means for moving said working head toward the work and means tending to hold said carrier against movement in relation to the head but adapted to permit said carrier to move in relation to the working head in response to the engagement of the electrode by the work at the end of a movement of the head toward the work support.

4. In a soldering and welding machine, a base, a work support on said base, a guide adjacent said work support, a working head movable on said guide toward and away from the work, a plurality of laterally disposed electrode carriers on said working head, means for holding said head and carriers withdrawn from the base, electrodes mounted on said carriers, a circuit including said electrodes, an electric power source in said circuit, the guide for said working head including a member having a slot defining the desired path of movement of the head, said head including guide members for said carriers having slots aligned with the slot of said guide member, and guide pins on said head extending through the guide slot of the guide and through the guide slots of the carriers.

5. In a soldering and welding machine, a base, a work support on said base, a guide adjacent said work support, a working head movable on said guide toward and away from the work, a plurality of laterally disposed electrode carriers on said working head, means for holding said head and carriers withdrawn from the base, electrodes mounted on said carriers, a circuit including said electrodes, an electric power source in said circuit, the guide for said working head including a member having a slot defining the desired path of movement of the head, said head including guide members for said carriers having slots aligned with the slot of said guide member, guide pins on said head extending through the guide slot of the guide and through the guide slots of the carriers, and yielding means adapted to hold said carriers against movement in relation to said head and to permit movement of the carriers in relation to the head in response to contact of the electrodes with the work.

JAMES J. KIRBY.